United States Patent Office 3,068,285
Patented Dec. 11, 1962

3,068,285
BORON COMPOUNDS CONTAINING HYDROCARBON RADICALS, HYDROGEN AND NITROGEN, AND A PROCESS FOR THE PRODUCTION THEREOF
Roland Köster, Mulheim (Ruhr), Germany, assignor to Studiengesellschaft Kohle m.b.H., Mulheim (Ruhr), Germany, a corporation of Germany
No Drawing. Filed June 4, 1957, Ser. No. 663,368
Claims priority, application Germany June 8, 1956
10 Claims. (Cl. 260—563)

This invention relates to boron compounds containing hydrocarbon radicals, hydrogen and nitrogen, and a process for the production thereof.

It has already been proposed to prepare boron compounds containing hydrocarbon radicals and hydrogen by heating boron compounds of the general formula $R_3B$, in which R represents a hydrocarbon radical, with hydrogen under pressure at temperatures from 120°–160° C. According to this prior process, it is theoretically possible completely to hydrogenate the boron hydrocarbons, especially boron alkyls, to form boron hydride $B_2H_6$, but pure $B_2H_6$ can only be obtained under special conditions, since it is known that boron hydride, at high temperatures in the region of 180° C., reacts in a complicated manner with saturated hydrocarbons which are formed in the reaction.

It has now been found that all the hydrocarbon radicals on such boron compounds can be replaced by hydrogen without special precautionary measures if addition compounds of boron hydride $B_2H_6$ in its hypothetical monomeric form $BH_3$ are prepared. According to the invention, boron compounds containing hydrocarbon radicals, hydrogen and nitrogen can be produced by heating a boron compound of the general formula $R_3B$, in which R represents a hydrocarbon radical, preferably an aliphatic hydrocarbon radical, in the presence of a tertiary amine of the general formula $NR'R''R'''$, in which R', R" and R''' represent hydrocarbon radicals, preferably aliphatic, hydroaromatic or aromatic hydrocarbon radicals, with hydrogen under pressure at a temperature of more than 120° C. N-trihydrocarbon borazanes in which at least one of the hydrocarbon radicals contains two or more carbon atoms are new compounds.

At temperatures higher than 140° C., the addition compounds of boron trialkyls or other boron hydrocarbons and tertiary amines of the general formula $BR_3.NR_3$ are converted in accordance with the following equation into addition compounds of borine $BH_3$:

$$BR_3.NR_3 + 3H_2 = BH_3.NR_3 + HR$$

In this equation, each R represents a hydrocarbon radical, preferably an aliphatic, hydroaromatic or aromatic hydrocarbon radical.

The temperature during the reaction can be raised to 300° C. or more. When the process is carried out at a temperature between 220 and 250° C., no undesirable secondary reactions occur and the yield of the required final products is not reduced. It was not to be expected that there would be no secondary reactions at such high reaction temperatures, since it is known that boron hydrides, for example $B_2H_6$, react in a complicated and unforeseeable manner at temperatures higher than 180° C. with saturated hydrocarbons such as are concurrently formed in the reaction according to the invention. (cf. D.T. Hurd, J. Am. Chem. Soc., 70, 2053 (1948)).

Most of the N-trialkyl borazanes produced by the process of the invention which were hitherto unknown are liquid; they have an extraordinarily high thermal stability in spite of the fact that according to their formula they can be interpreted as being addition compounds of the hypothetical borine $BH_3$, so that no complications arise during the production thereof at temperatures up to about 300° C. This possibility of using a high reaction temperature is a substantial advantage of the process of the invention. It is in fact possible to achieve quantitative conversion to the required borazane within a short time.

In principle, all known boron hydrocarbons can be used as starting material. It is preferred to use boron trialkyls, which can now be produced very easily from the corresponding aluminum trialkyls. The process of the invention can be carried out without solvents, or in the presence of an inert solvent, for example in the presence of a saturated aliphatic or aromatic hydrocarbon, an ether or a boric acid ester. The use of diluents is generally not necessary, since in the reaction in accordance with the invention hydrocarbons are formed in any case, these hydrocarbons dissolving the various reactants and the substances being formed.

The pressures used in the process can be chosen as required. It is desirable to work at a pressure of about 10 atm., and working at a pressure of more than 50 atm. is particularly advantageous, since the reaction time is closely dependent on the hydrogen concentration.

Of the N-trihydrocarbon borazanes, only trimethyl borazane is already known. It is a well crystallised solid compound (cf. A. B. Burg, H. I. Schlesinger: J. Am. Chem. Soc., 59, 780/7 (1937)). It sublimes very readily, even at room temperature. It has not hitherto been possible for the higher analogues to be produced in a satisfactory manner.

The present invention provides as novel compounds N-trihydrocarbon borazanes in which at least one of the hydrocarbon radicals contains two or more carbon atoms, and in particular the compounds N-triethyl borazane, N-diethyl-n-butyl borazane, N-tri-n-butyl borazane, N-dimethyl-cyclohexyl borazane and N-dimethyl-phenyl borazane.

The novel compounds, which can be produced by the process of the invention, are practically always colourless liquids, which generally no longer smell like amines, if methyl groups are not present on the nitrogen atom. Examples of compounds which do have methyl groups on the nitrogen atom are N-dimethyl phenyl borazane and N-dimethyl cyclohexyl borazane. The borazanes are sensitive to air and do not react with alkaline or neutral aqueous solvents. It is only on acidification that hydrogen is liberated as a gas. The novel borazanes do not sublime.

The N-trialkyl borazanes are suitable for reduction purposes in inorganic and especially organic chemistry, in the same way as the metal borohydrides. As compared with alkali metal and alkaline earth metal boranates, they have the advantage of not giving such a strong alkaline reaction after reduction has begun. Nevertheless, their reduction power is not less than that of complex metal borohydrides. As compared with the latter, they have the further advantage that they have far better solubility in many organic solvents.

The N-trialkyl borazanes produced by the process of the invention can be purified easily and obtained in an absolutely pure form, generally by dissolution in and recrystallisation from hydrocarbons, but preferably by sublimation or distillation. On the whole, the compounds produced by the process of the invention are, however, so pure that such purification processes are not necessary.

The following examples further illustrate the invention.

EXAMPLE 1

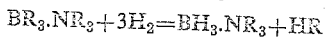

123 g. (0.79 mol) of the addition compound obtained from trimethylamine and boron triethyl are placed in a 500 cc. autoclave. After hydrogen has been introduced to give a pressure of 300 atm., the addition compound is heated with shaking to 180 to 190° C. and left to react at this temperature for 10 hours, the pressure falling to 120 atm. at room temperature. After the ethane (72 g.) which is formed, has been blown off a colourless solid compound is left in the autoclave and this can be dissolved in and recrystallised from warm hexane. Gas analysis (decomposition of a sample of the substance with dilute acid) of the N-trimethyl borazane purified in this way yields the expected quantity of hydrogen.

EXAMPLE 2

N-Triethyl Borazane (Borine Triethylamine)

A mixture of 63 g. (0.346 mol) of boron triisobutyl and 35.2 g. (0.349 mol) of triethylamine is heated in a 200 cc. autoclave with shaking to about 180° C., after hydrogen has been forced in to give a pressure of 320 atm. Within approximately 5 hours, the pressure has fallen to approximately 95 atm. at 180° C.; after isobutane has been blown off, fresh hydrogen is introduced to give a pressure of 300 atm. and the reaction is completed at the same temperature under the conditions indicated. After another 5 hours, the pressure reaches a constant final value (about 70 atm. at 20° C.). A total of 58 g. of isobutane is collected in a low temperature trap. 40 g. of a colourless, slightly cloudy liquid are removed from the autoclave. After distillation (B.P.= 100–101° C.), N-triethyl borazane is obtained in an analytically pure form with the corresponding hydrogen value (M.P. −4° C.).

EXAMPLE 3

N-Dimethyl-Cyclohexyl Borazane (Borine Dimethyl Cyclohexylamine)

A mixture of 34 g. (0.345 mol) of boron triethyl and 44 g. (0.345 mol) of dimethyl cyclohexylamine is reacted at 190–200° C. for 15 hours in a 300 cc. autoclave with a hydrogen pressure of 300 atm. The pressure falls to a constant value (80 atm. at room temperature). After 32 g. of ethane together with the excess hydrogen have been blown off, the autoclave contains a colourless well-crystallised compound. This compound, even as a crude product, gives a hydride hydrogen content of about 95% of the theoretical by decomposition with dilute sulphuric acid. After being dissolved in and recrystallised from hexane or cyclohexane, the N-dimethyl cyclohexyl borazane is obtainable in a completely pure form (finely developed crystals) with a melting point of 49° C. The yield is 95% of the theoretical.

EXAMPLE 4

N-Dimethyl-Phenyl Borazane (Borine Dimethyl Aniline)

The addition compound of 38 g. (0.388 mol) of boron triethyl and 47 g. (0.388 mol) of dimethyl aniline is heated to 190° C. under a hydrogen pressure of 300 atm. The fall in pressure is complete after a reaction time of about 15 hours. The ethane (34 g.) which is formed is blown off together with excess hydrogen. The autoclave then contains 46 g. of a yellow-coloured liquid. This can be distilled under reduced pressure, partial decomposition nevertheless taking place. A colourless liquid is obtained, the hydride hydrogen content of which corresponds to the N-dimethyl phenyl borazane; the yield is between 70 and 80% of the theoretical (M.P. 35° C.).

EXAMPLE 5

834 g. (8.5 mols) of boron triethyl and 870 g. (8.6 mols) of triethylamine are drawn in succession (or in previously mixed form) into an evacuated 5-litre roller-type iron autoclave, a hydrogen pressure of 250 atm. is applied and the substances heated to 220 to 240° while rolling (maximum pressure in this case about 360 atm.). After 2–3 hours, the pressure has fallen to about 250 atm. at 220° C. An additional hydrogen pressure of 40 atm. is applied with heating and the reaction is completed at 240° C. in another 2 hours. After the autoclave has been cooled and the gases (excess hydrogen and ethane) have been blown off, N-triethyl borazane is obtained as a colourless liquid which, in a water-jet vacuum, after a small quantity of first runnings (triethylamine) has been drawn off, has a constant boiling point of 100–101° C./12 mm. Hg. Yield=960 g. (98% of theoretical); melting point=−4° C.

EXAMPLE 6

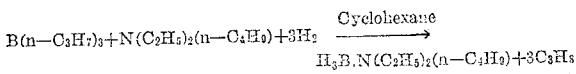

A solution of 140 g. (1 mol) of boron tri-n-propyl and 129 g. (1 mol) of diethyl-n-butylamine in 100 cc. of cyclohexane is introduced under nitrogen into a 750 cc. autoclave. A hydrogen pressure of 300 atm. is applied, whereafter the autoclave is shaken for 5 hours at a temperature of approximately 200° C., the pressure quickly falling. Subsequently, after cooling, the propane which is formed is blown off with the excess hydrogen. The cyclohexane solution of N-diethyl-n-butyl borazane is removed and, after the solvent has been distilled off, contains as a colourless residue 140 g. of the liquid borazane, this being a quantitative yield. The compound can be distilled under reduced pressure (B.P. 14 mm.=125° C.; melting point −33/−32° C.).

EXAMPLE 7

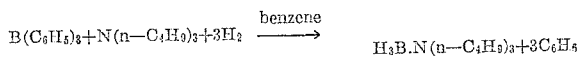

A solution of 121 g. (0.5 mol) of boron triphenyl in 250 cc. of benzene is placed in a nitrogen atmosphere in a 750 cc. autoclave. 93 g. (0.5 mol) of tri-n-butylamine is added and a hydrogen pressure of 200 atm. is applied. The autoclave is then heated to about 200° C., the pressure falling within 4–5 hours to a constant value (about 30 atm. at room temperature). After the autoclave has been cooled and the excess hydrogen has been blown off, the benzene solution of the N-tri-n-butyl borazane which is formed can be removed. After the benzene has been distilled off, finally under reduced pressure, there is obtained a colourless liquid which can be distilled under high vacuum; the yield is practically quantitative (B.P.=87° C.).

EXAMPLE 8

A mixture of 1.4 kg. (10.0 mols) of boron tri-n-propyl and 1.1 kg. (about 11.0 mols) of triethylamine is heated to 200–220° in a 5-litre autoclave with a stirrer mechanism. A hydrogen cylinder is connected to the autoclave by way of a pressure-reducing valve, so that a hydrogen pressure of about 20 atm. is constantly maintained during the reaction. The reaction is allowed to proceed for approximately 48 hours, the propane formed being removed at intervals through a pressure condenser. 1.1 kg. of N-triethyl borazane (yield about 95–96% of the theoretical) are obtained, and this compound can be purified by subsequent distillation (B.P.=12 mm.=100/101° C.).

What I claim is:

1. A process for the production of boron compounds having the general formula $BH_3 \cdot NR'R''R'''$, wherein R', R" and R''' represent members selected from the group consisting of saturated lower alkyl, saturated cyclo- lower alkyl and phenyl radicals, which comprises contacting a boron compound of the general formula $R_3B$, in which R is a lower alkyl radical with hydrogen under positive pressure under the reaction conditions and at a temperature of from about 120–300° C., in the presence of a tertiary amine $NR'R''R'''$, in which R', R" and R''' are as defined above, and recovering the boron compound $BH_3 \cdot NR'R''R'''$ thereby formed.

2. A process according to claim 1, wherein said contacting is effected at a temperature between 140 and 300° C.

3. A process according to claim 1, wherein said contacting is effected at a pressure of at least 10 atmospheres.

4. A process according to claim 3, wherein said contacting is effected at a pressure of at least 50 atmospheres.

5. A process according to claim 1 in which said contacting is effected in the presence of an inert solvent.

6. A process according to claim 5, wherein said solvent is selected from the group consisting of saturated aliphatic hydrocarbons, aromatic hydrocarbons, ethers and boric acid esters.

7. A process according to claim 1, wherein the product of the process is purified by dissolution in and recrystallisation from a hydrocarbon.

8. A process according to claim 1, wherein the product of the process is purified by sublimation.

9. A process according to claim 1, wherein the product of the process is purified by distillation.

10. A process according to claim 1 in which said contacting is effected in an inert gas atmosphere.

References Cited in the file of this patent

UNITED STATES PATENTS

| | | |
|---|---|---|
| 2,678,949 | Banus et al. | May 18, 1954 |
| 2,860,167 | Brown | Nov. 11, 1958 |

OTHER REFERENCES

Goubeau: Cited in F.I.A.T. Reviews of German Science: Inorganic Chemistry, vol. I, pages 228 to 229 (1939 to 1946).

Patterson: Chemical and Engineering News, vol. 34, page 560 (1956).